US005413270A

United States Patent [19]

Lechervy et al.

[11] Patent Number: 5,413,270

[45] Date of Patent: May 9, 1995

[54] METHOD FOR REMOVING A PORTION OF A COATING BY LIQUID JETS

[75] Inventors: Pierre M. S. Lechervy, Ste Genevieve des Bois; Paul L. Silva, Vert Saint Denis, both of France

[73] Assignee: Societe Nationale D'Etude et de Construction de Moteurs D'Aviation "SNECMA", Paris, France

[21] Appl. No.: 174,403

[22] Filed: Dec. 28, 1993

[30] Foreign Application Priority Data

Jan. 6, 1993 [FR] France ................................ 93 00042

[51] Int. Cl.[6] .......................... B23K 20/18; B24C 5/02

[52] U.S. Cl. ..................................... 228/118; 427/273

[58] Field of Search .............. 228/118, 172, 174, 20.1, 228/157, 193; 427/271, 273; 118/63

[56] References Cited

U.S. PATENT DOCUMENTS 4,111,490 9/1978 Liesveld ................................ 299/17

4,220,276 9/1980 Weisert et al. ........................ 228/118

4,535,576 8/1985 Shukla et al. .......................... 51/413

5,024,368 6/1991 Bottomley et al. ............. 228/193 X 5,052,155 10/1991 Blacka et al. .......................... 51/413

5,068,513 11/1991 Gangemi ......................... 219/121.67

*Primary Examiner*—P. Austin Bradley

*Assistant Examiner*—Jeanne M. Elpel

*Attorney, Agent, or Firm*—Oblon, Spivak, McClelland, Maier & Neustadt

[57] ABSTRACT

A method for removing a portion of a coating disposed on a plate, in which a nozzle having a wide jet is first utilized to remove most of the material of the portion to be removed. Successively or concurrently therewith, at least one fine jet nozzle is utilized to cut the contour of the portion of the coating being removed. The method is particularly advantageous for removing deposits of a plasma deposition, and more particularly for deposits which resist a diffusion welding or soldering of plates or substrates with one another.

12 Claims, 1 Drawing Sheet

METHOD FOR REMOVING A PORTION OF A COATING BY LIQUID JETS

FIELD OF THE INVENTION

The invention concerns a method to remove a portion of a coating by using liquid jets. Its field of application more particularly concerns plates initially covered with a coating intended to resist a diffusion welding or soldering of this plate with another plate which is coupled when a sufficient pressure crushes them against each other.

BACKGROUND OF THE INVENTION

Certain structures are produced by exploiting the superplasticity properties of certain alloys. Two plates of these alloys are superimposed and placed between two moulds, one of said moulds comprising cavities with a specific shape. The moulds are pressed together and a suitable device is able to inject gas under pressure between the plates, whose material yields in the cavities until their contour is married whilst being diffusion-welded to the other plate in front of the other portions of the moulds. However, it is necessary to cover one of the plates with a deposit of yttrium oxide or another substance having the property of resisting diffusion welding at the locations where this welding is not desired and especially in front of the cavities. One method of this type is illustrated by the U.S. Pat. No. 4,220,276. However, the deposit in practice is plasma-projected over the entire surface after a mask has been placed at the locations where the deposit needs to be withdrawn, the mask then being pulled up from the surface with the portion of the deposit which covers it. But the placing and preparation of the mask, especially when cutting it at the desired locations, takes up time and there is a risk that the mask may be damaged when cutting it.

The invention concerns a method to obtain an identical product whose main feature is the use of an under-pressure liquid jet for pulling up the coating at the locations it touches without inserting a mask.

The use of under-pressure liquid jets for removing material is already well-known to experts in this field. It normally concerns jets bearing abrasive particles, garnet for example, which cut plates, sheets or similar products. The application is somewhat different as in this instance it is desired not to touch the sheet itself, which generally requires that no abrasive is used in the liquid, but there is nevertheless a conventional problem of these machinings where the contour of the material removed is jaggy and lacks cleanness. In the current application, the result is that the shape of the portions of the plates yielding in the cavities, which shall generally constitute stiffening ribs, is not sufficiently regular, which may have a negative effect on the mechanical behaviour of the structure finally obtained.

SUMMARY OF THE INVENTION

The technical effect of the method of the invention consists of obtaining perfectly clean, precise and regular contours of the portion whose coating is removed. The device used to obtain this result consists of at least one main depth cut carried out with a wide liquid jet where the coating is removed from almost the entire portion and at least one finishing depth cut effected with a fine jet where the coating is removed from the contour of the portion; the fine jet may be slanted laterally with respect to the contour and directed towards the portion as the inventors have observed that this disposition provided the best results.

The main depth cut and finishing depth cut may be successive or preferably simultaneous by using a head with multiple jets.

BRIEF DESCRIPTION OF THE DRAWINGS

The invention is now to be described with the aid of the accompanying FIGS. 1 and 2 given by way of non-restrictive illustration.

DETAILED DESCRIPTION OF THE PREFERRED EMBODIMENTS

Figure 1:
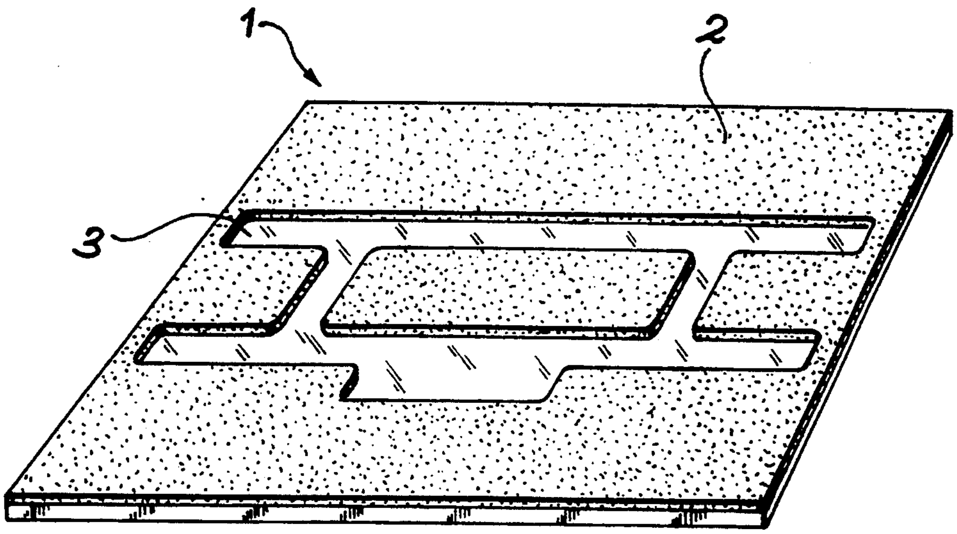
FIG. 1 illustrates a plate partially covered with a deposit.
Figure 2:
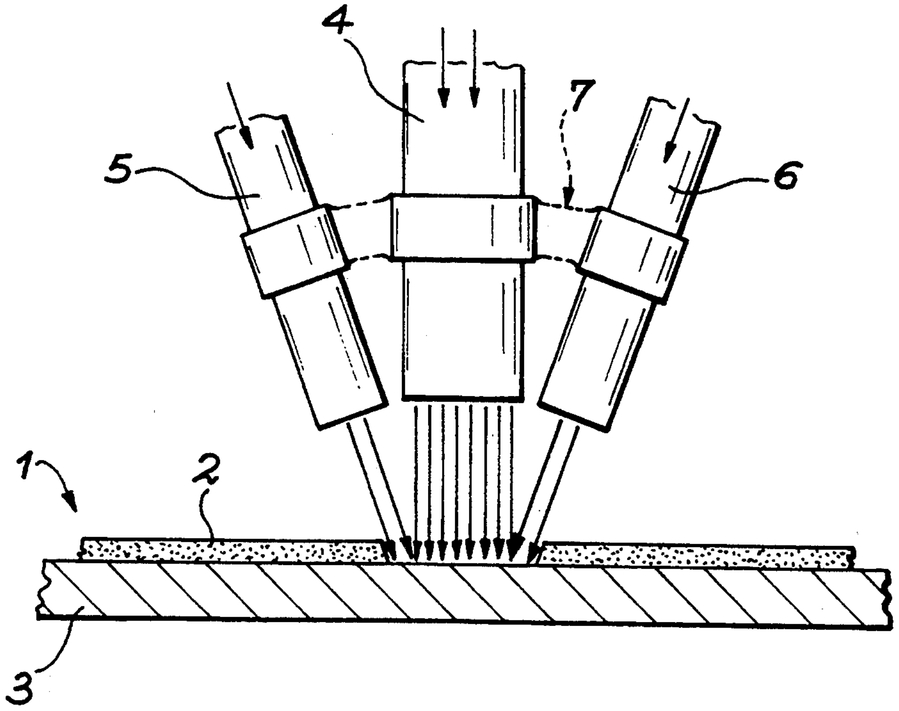
FIG. 2 illustrates the method.

The plate 1 of FIGS. 1 and 2 is a superplastic titanium alloy and is coated with an yttrium oxide coating 2 on its upper surface, but is is advisable to free one portion 3 of it which may be formed of interlaced strips partioning off portions intended to be deformed. Thus, a wide jet nozzle 4 (FIG. 2) is used for removing the coating from the largest portion of the strips of the portion 3 and two fine jet nozzles 5 and 6 for removing the coating at the contour of the strips of the portion 3. The fine jet nozzles 5 and 6 pass after the wide jet nozzle 4 during a depth cut and are fully separated or shortly following this nozzle 4. The nozzles 4, 5 and 6 may then be disposed on a linking frame 7 which links them together. This frame may be formed of deformable elements so as to adapt the disposition of the nozzles to all possibilities. In particular, the fine jet nozzles 5 and 6 may be slanted by a small angle, namely about 10° to 20°, in a lateral direction with respect to the direction of the strip in question, so that the fine jets are directed towards the strip in question, which tapers the edges of the deposit 2, rectifies them better and makes it possible to obtain improved cleanness of the edges, thus preventing them from flaking.

The liquid may be pure water or charged with an abrasive incapable of damaging the material of the plate 1. It is possible to use several wide jet nozzles 4 if the portion 3 is formed of strips where the width requires that several jet nozzles be used. It is also possible to use a single fine jet nozzle which is then used for rectifying the entire contour of the portion 3.

The nozzles 4, 5 and 6 may be selected from nozzles used for machining with a liquid jet according to criteria accessible to experts in this field : thus, they are not described in this particular instance. They are fed with liquid derived from a tank by means of a pump which carries the liquid at a pressure which may be several hundreds or thousands of bars according to the applications and in particular the thickness and physico-chemical nature of the coating 2, as currently done. All the nozzles may be fed by a single device. Finally, the machine used may be any type of machine for machining with a liquid jet whose feeding with an abrasive has been rendered inactive.

One fruitful test concerned placing a deposit of yttrium oxide with a thickness of 0.05 mm on a TA6V plate (alloy with a titanium base including 6% of aluminium in weight and vanadium). The liquid was pure water between 1500 and 2500 bars. The nozzle had an opening with a diameter of 0.5 mm and moved 10 mm from the surface at a speed of 1340 mm/mn.

What is claimed is:

1. A method for removing a portion of a coating which resists a diffusion welding and which covers a surface of a plate comprising:

cutting at least one main depth cut with a wide liquid jet to remove the coating over almost the entire portion; and cutting at least one finishing depth cut with a fine jet to remove the coating from a peripheral contour of the portion.

2. The method according to claim 1, wherein the step of cutting at least one finishing depth cut includes performing said at least one finishing depth cut with the fine jet slanted laterally with respect to the peripheral contour and directed towards the portion.

3. The method according to claim 1, further including performing the main and finishing depth cuts successively.

4. The method according to claim 1, further including performing the main and finishing depth cuts simultaneously by using a head having multiple jets.

5. The method of claim 1, further including providing a linking frame, and mounting said wide liquid jet and said fine jet on said linking frame.

6. The method of claim 1, further including providing a pair of fine jets, and mounting said pair of fine jets on a linking frame.

7. The method of claim 6, further including mounting said wide liquid jet on said linking frame at a position between said pair of fine jets.

8. The method of claim 7, further including disposing said pair of fine jets at an angle with respect to said wide liquid jet.

9. The method of claim 8, wherein the step of disposing said pair of fine jets at an angle includes disposing said fine jets at an angle of 10°–20° with respect to said wide liquid jet.

10. The method of claim 5, further including disposing said fine jet at an angle with respect to said wide liquid jet.

11. The method of claim 10, wherein the step of disposing said fine jet at an angle includes disposing said fine jet at an angle of 10°–20° with respect to said wide liquid jet.

12. The method of claim 1, wherein the step of cutting at least one finishing depth cut includes cutting said at least one finishing depth cut with said fine jet disposed at an angle relative to said wide liquid jet. utilized to remove most of the material of the portion to be removed. Successively or concurrently therewith, at least one fine jet nozzle is utilized to cut the contour of the portion of the coating being removed. The method is particularly advantageous for removing deposits of a plasma deposition, and more particularly for deposits which resist a diffusion welding or soldering of plates or substrates with one another.

* * * * *